United States Patent
Lee et al.

(10) Patent No.: US 7,411,625 B2
(45) Date of Patent: Aug. 12, 2008

(54) AUTO FOCUS LENS SYSTEM

(75) Inventors: Yi-Ming Lee, Taipei (TW); Wei-Kuo Shih, Taipei Hsien (TW)

(73) Assignee: Lite-On Technology Corporation, Taipei (TW)

( * ) Notice: Subject to any disclaimer, the term of this patent is extended or adjusted under 35 U.S.C. 154(b) by 716 days.

(21) Appl. No.: 10/953,730

(22) Filed: Sep. 29, 2004

(65) Prior Publication Data

US 2006/0066745 A1   Mar. 30, 2006

(51) Int. Cl.
*H04N 5/225* (2006.01)
(52) U.S. Cl. .................................. 348/361; 348/340
(58) Field of Classification Search ................ 348/357, 348/345, 361, 340; 359/699, 704, 700; 396/85, 396/139, 133; 501/50
See application file for complete search history.

(56) References Cited

U.S. PATENT DOCUMENTS

| | | | | |
|---|---|---|---|---|
| 4,767,455 A * | 8/1988 | Jourdan | ........................ | 75/610 |
| 5,241,422 A * | 8/1993 | Shimada et al. | ............. | 359/694 |
| 6,704,505 B1 * | 3/2004 | Hung | ........................... | 396/85 |
| 6,798,093 B2 * | 9/2004 | Aoshima | .................. | 310/49 R |
| 6,800,970 B2 * | 10/2004 | Aoshima | ................... | 310/49 R |
| 7,039,309 B2 * | 5/2006 | Hsiao | ........................... | 396/85 |
| 7,092,031 B1 * | 8/2006 | Wiedemann | ................ | 348/374 |
| 7,342,606 B2 * | 3/2008 | Suh | ......................... | 348/240.3 |
| 2006/0034599 A1 * | 2/2006 | Osaka | ......................... | 396/144 |
| 2006/0193620 A1 * | 8/2006 | Harrington et al. | ............ | 396/85 |
| 2006/0245747 A1 * | 11/2006 | Tiao et al. | ...................... | 396/85 |
| 2007/0166022 A1 * | 7/2007 | Lai | .............. | 396/133 |
| 2007/0223903 A1 * | 9/2007 | Ho et al. | ........................ | 396/85 |
| 2008/0063390 A1 * | 3/2008 | Hsiao et al. | .................. | 396/133 |

* cited by examiner

*Primary Examiner*—Lin Ye
*Assistant Examiner*—Marly Camargo
(74) *Attorney, Agent, or Firm*—Rosenberg, Klein & Lee

(57) ABSTRACT

An auto focus lens for digital cameras comprises a coil base, a lens barrel, and an elastic component. The coil base which has a coil wounded around in a specific direction and which has an accommodation hole whose bottom is provided with a stopper. The surface of the lens barrel is distributed with a permanent magnet and the lens barrel is rotatably installed inside the accommodation hole. One of the lens barrel's ends has a guide surface, slant and close to the stopper. The elastic component presses against the other end of the lens barrel so that the guide surface touches the stopper permanently. When the coil is provided with an electric current, a magnetic force is generated to repel the permanent magnet on the lens barrel. The lens barrel thus rotates up and down according to the design of the guide surface, and thereby the focal length of the camera is changed.

2 Claims, 5 Drawing Sheets

AUTO FOCUS LENS SYSTEM

BACKGROUND OF THE INVENTION

1. Field of Invention

The invention relates to a lens for digital cameras and, in particular, to an auto focus lens system.

2. Related Art

There are many ways to help people memorize happy times. Taking pictures is one of the most frequent ways. Therefore, one often needs to use a camera for recording the memorable moments. As we can see, the designs of cameras have evolved toward compact styles, so have the currently popular digital cameras.

The focus structure of digital cameras can be roughly divided into a manual focus structure and an auto focus structure. The manual focus structure allows one to focus the lens to a desired position, whereas the auto focus structure focuses on an object by comparing with the image on an image sensor. The image sensor is either a charge coupled device (CCD) sensor or a complementary metal oxide semiconductor (CMOS) sensor, and is controlled by a central processing unit (CPU) installed inside the digital camera. In the beginning, the lens moves back and forth around its original position (static position). As the lens moves, the CPU compares the image from the lens with the image in the image sensor. Finally, as the lens moves to the position where the image is the clearest, then the lens stops at the position. In this case, the lens has to be continuously driven back and forth by an annular cam. The annular cam is provided with a lens driving structure and driven to rotate by a stepping motor. At the moment when the CPU detects a clearest image as the lens moves back and forth, a stop signal is simultaneously sent to the lens. Therefore, the lens stops at the best focal position (static position). When the lens is to be moved back to the original position, the annular cam starts to rotate again. Once the lens moves back to its original position, the photo interrupter installed by the lens cylinder uses the shutter at the border of the lens cylinder, to detect the original position of the lens. The shutter will interrupt the light of the penetration-type photo interrupter. The lens stops at the moment when the photo interrupter detects the original position.

Consequently, the lens in a digital camera auto focus system has to be driven continuously, so is the image detection. Every time an image is captured, the lens has to return to its original position. Thus, the lens focusing procedure is very time-consuming, which, in most of cases, results in losing the best image-capturing time. Moreover, the structure including a stepping motor, an annular cam, and a photo interrupter is very expensive.

With reference to the cross-sectional view of a traditional digital camera auto focus structure in FIG. 1 and the corresponding three-dimensional view in FIG. 2, when the stepping motor 1 receives a start signal from the digital camera CPU, it starts to rotate. A stepping motor gear 2 that matches with an annular cam gear 3 provided at the border of the annular cam 4 also rotates. The annular cam 4 thus starts to rotate because of the stepping motor gear 2 and the annular cam gear 3. A position-detecting rod 5 moves back and forth (up and down) along the slope surface of the annular cam 4. The whole lens module 6 moves back and forth along a track 7. One side of the lens cylinder is provided with a sheath, where the position-detecting rod 5 is installed as one part and protrudes from the sheath. The outermost part of the sheath of the lens module 6 is provided with a bearing 8 moving back and forth along the track 7. The other side of the lens is provided with a position-fixing fork 9 as one part of the lens cylinder. A position-fixing pin 10 is provided between the two terminals of the position-fixing fork 9.

The bearing 8, the track 7, the position-fixing fork 9 and the position-fixing pin 10 support the lens module 6. The lens module 6 is always pressed toward an image sensor 11 by a coil spring 12, so that the tip of the position-detecting rod 5 always appropriately touches the slant surface of the annular cam 4.

When the power of the digital camera is turned on, the image is formed on the image sensor 11 by the lens module 6. Once the switch of the auto focus structure is turned on, the image focusing is transmitted to the CPU in a continuous way for checking the image formed on the image sensor 11. When the image becomes clearest, the CPU sends out a stop-checking signal, and the stop-checking signal stops the stepping motor 1, releases the shutter, and captures the image. After these steps, the lens module 6 has to return to its original position (static position). A shutter-detecting blade 13 is provided at the edge of the annular cam 4. After capturing the image, the annular cam 4 starts to rotate again to bring the lens module 6 back to its original position. When the shutter-detecting blade 13 enters the slit of the photo interrupter 14, the beam in the photo interrupter 14 is interrupted by the shutter-detecting blade 13. The annular cam 4 immediately stops here so that the lens module 6 can return and stop at its original position. As shown in FIG. 2, the lens module is right at its original position.

The lens module 6 has to move back and forth for the CPU to check the image. This method of searching for an optimal focal point makes use of mechanical and continuous lens motion to repeatedly check the image. Thus, it is time-consuming so that the user may miss the best timing. Moreover, this complicated structure has to be finely assembled and adjusted. Its components are often very expensive. Therefore, it would be desirable to provide a simple structure that uses fewer cheap components while saving focusing time, electric power, and the required space.

SUMMARY OF THE INVENTION

An object of the invention is to provide an auto focus lens system that utilizes a simple structure composed of fewer, cheaper components, and saves focusing time, electric power, and the required space.

The disclosed auto focus lens system for a digital camera includes a coil base, a lens barrel, and an elastic component. The coil base which has a coil wounded around in a specific direction and which has an accommodation hole whose bottom is provided with a stopper. The surface of the lens barrel is distributed with a permanent magnet and the lens barrel is rotatably installed inside the accommodation hole. One of the lens barrel's ends has a guide surface which is a slant surface, close to the stopper. The elastic component presses against the other end of the lens base so that the guide surface touches the stopper permanently. When the coil is provided with an electric current, a magnetic force is generated in such a way to repel the permanent magnet on the lens barrel. The lens barrel thus rotates up and down according to the design of the guide surface, and thereby the focal length of the camera is changed.

The material of the lens barrel can be rare earth, which is used to further improve the quality of the permanent magnets. Through magnetization, the lens barrel is distributed with a permanent magnet so that it can rotate within the accommodation hole of the coil base.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
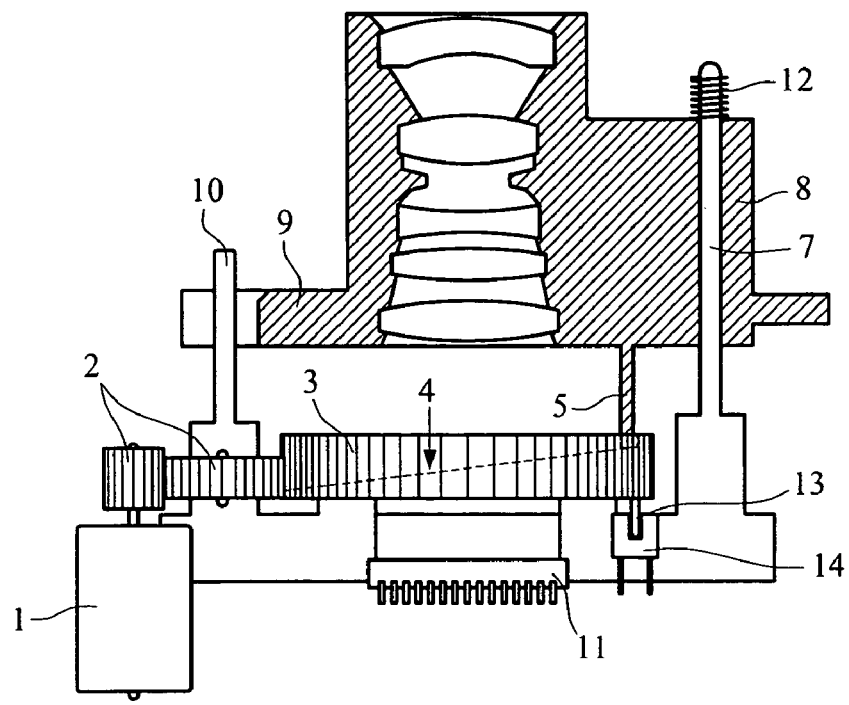
FIG. 1 is a cross-sectional view of an auto focus structure in the conventional digital camera.
Figure 2:
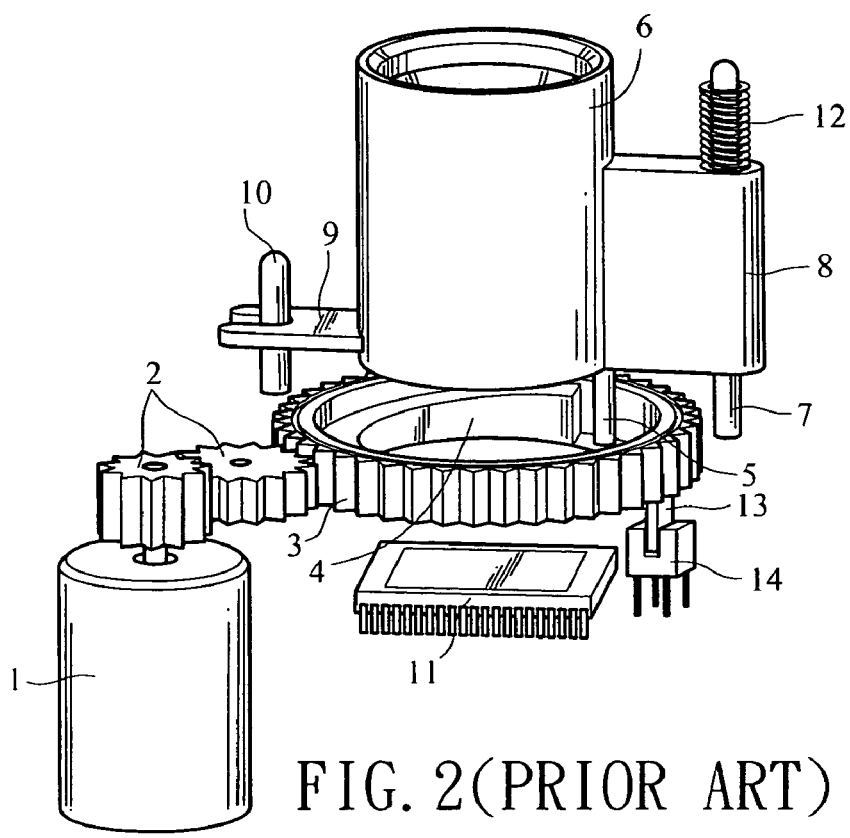
FIG. 2 is a three-dimensional view of an auto focus structure in the conventional digital camera.
Figure 3:
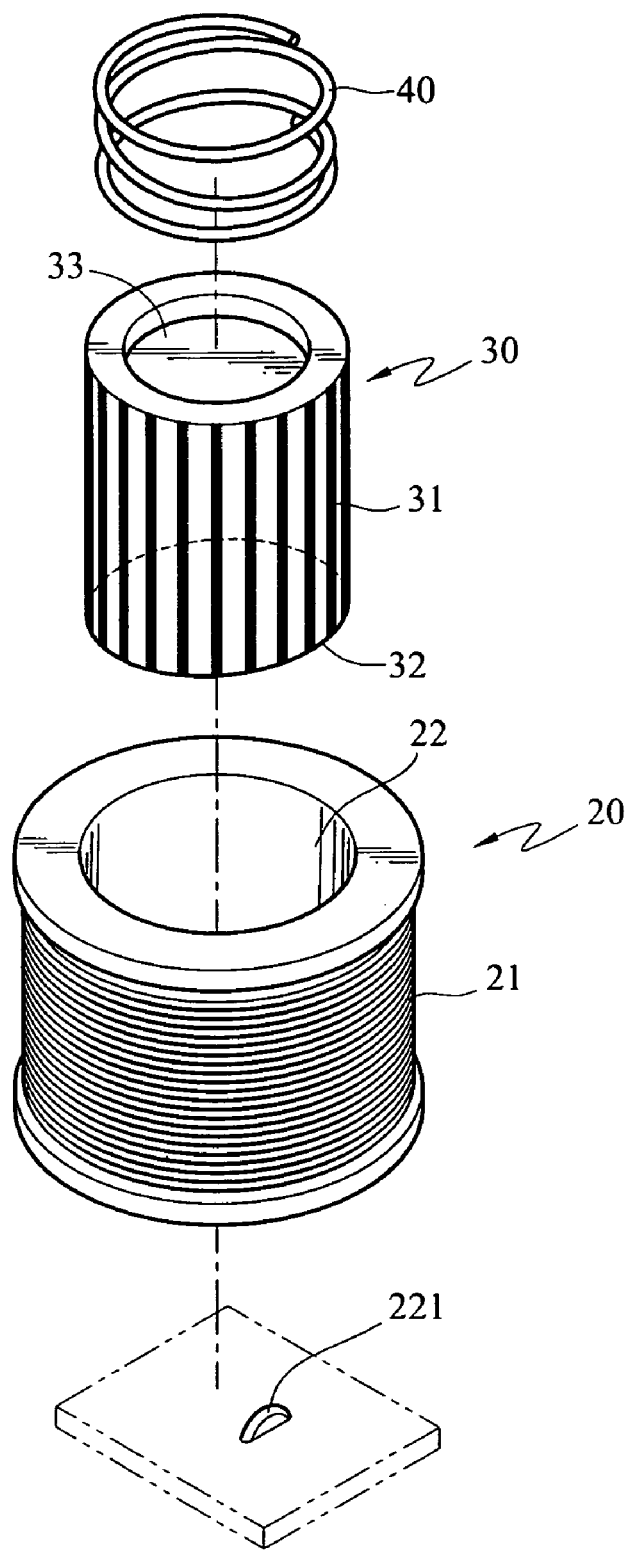
FIG. 3 is an exploded view of the auto focus lens system in a first embodiment.
Figure 4:
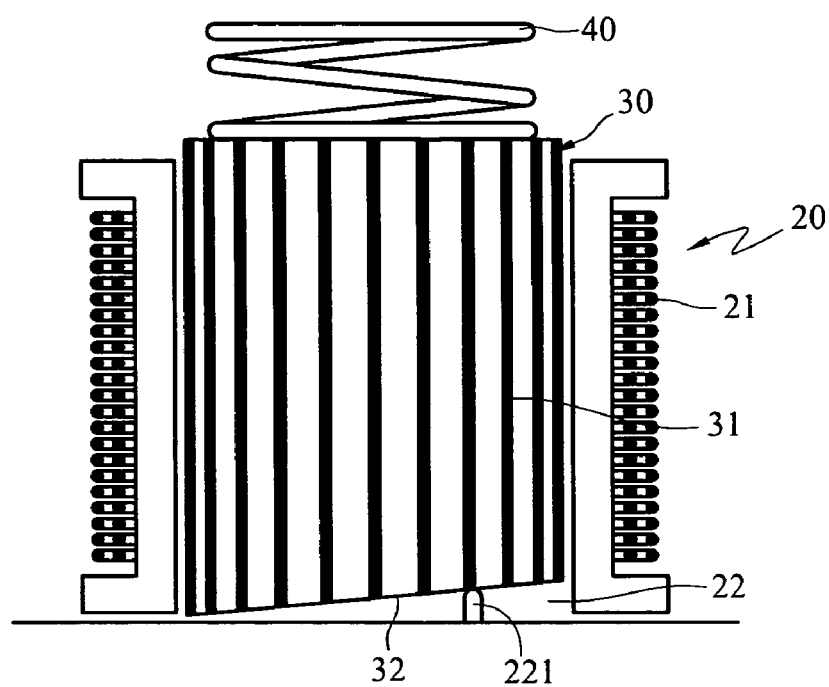
FIG. 4 is an assembly diagram of the auto focus lens system in a first embodiment.

The disclosed auto focus lens system for a digital camera contains a coil base 20, a lens barrel 30, and an elastic component 40. The coil base 20 which has a coil 21 wounded in a specific direction around it, and which has an accommodation hole 22 whose bottom is provided with a stopper 221. A lens 33 is installed inside the lens barrel 30. The material of the lens barrel 30 is a rare earth and the surface of the lens barrel 30 is distributed with a permanent magnet 31. The lens barrel 30 is rotatably installed inside the accommodation hole 22, with a guide surface 32 on one end which is near the stopper 221 of the lens barrel 30. The guide surface 32 is a slant surface. The elastic component 40 presses against the other end of the lens base 30 so that the guide surface 32 touches the stopper 221. When the coil 21 is provided with an electric current, a magnetic force is generated for the coil base 20 and the permanent magnet 31 on the lens barrel 30 to repel each other. The lens barrel 30 rotates according to the guide surface 32 to change the focal length of the camera.

Figure 5:
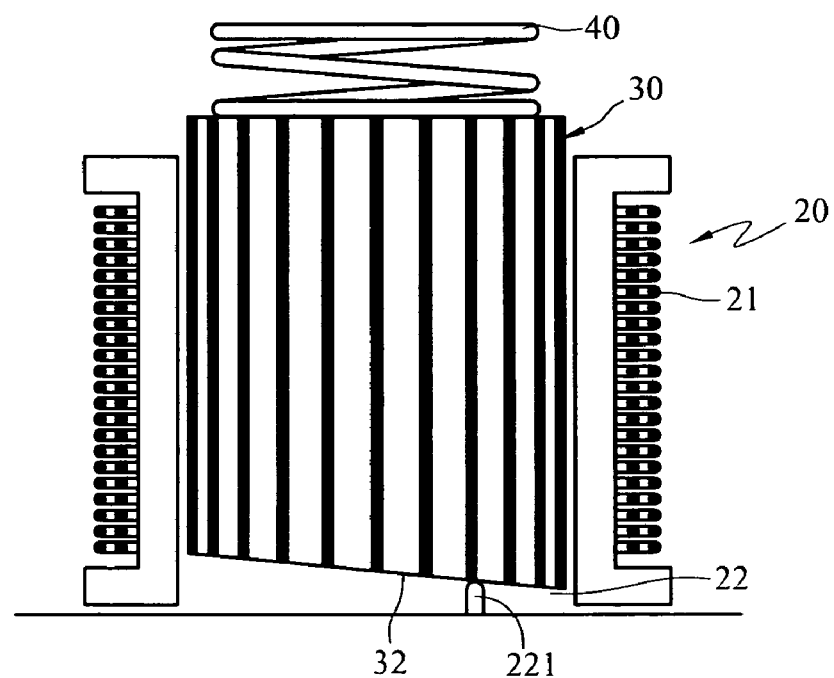
FIG. 5 is another assembly diagram of the auto focus lens system in a first embodiment.

Another assembly diagram of the auto focus lens system in the first embodiment is shown in FIG. 5. When the lens barrel 30 is installed inside the accommodation hole 22, the elastic component 40 presses against the other end of the lens base 30, making the guide surface 32 touch the stopper 221. When the coil 21 is provided with an electric current, a magnetic force is generated for the permanent magnet 31 on the lens barrel 30 and the coil base 20 to repel each other. The lens base 30 rotates according to the guide surface 32 to change the focal length of the camera. Since the guide surface 32 is a slant surface, the lens barrel 30 moves upward in the accommodation hole 22 of the coil base 20 during rotation. At the same time, the elastic component 40 presses the lens barrel 30 against the stopper 221 to constantly push the guide surface against the stopper. Alternatively, the lens barrel 30 can move toward the inner side of the coil base 20 during rotation. At the same time, the elastic component 40 presses the lens barrel 30 against the stopper 221, and thereby the focal length of the camera is changed. In other words, the lens barrel 30 is rotated by magnetic repulsion between the permanent magnet 31 and the magnetic force of the coil 21 when the coil 21 is applied with an electric current, such that the lens barrel 30 moves inwardly and outwardly along an axial direction of the accommodation hole 22 corresponding to the guide surface 32 and the stopper 221.

The reason why rare earth is used as the material of the lens barrel 30 is that the lens barrel 30 can be distributed with a permanent magnet 31 after magnetization. More specifically, the rare earth material is used as a permanent magnet. As a result, the lens barrel 30 can rotate within the accommodation hole 22 of the coil base 20.

Figure 6:
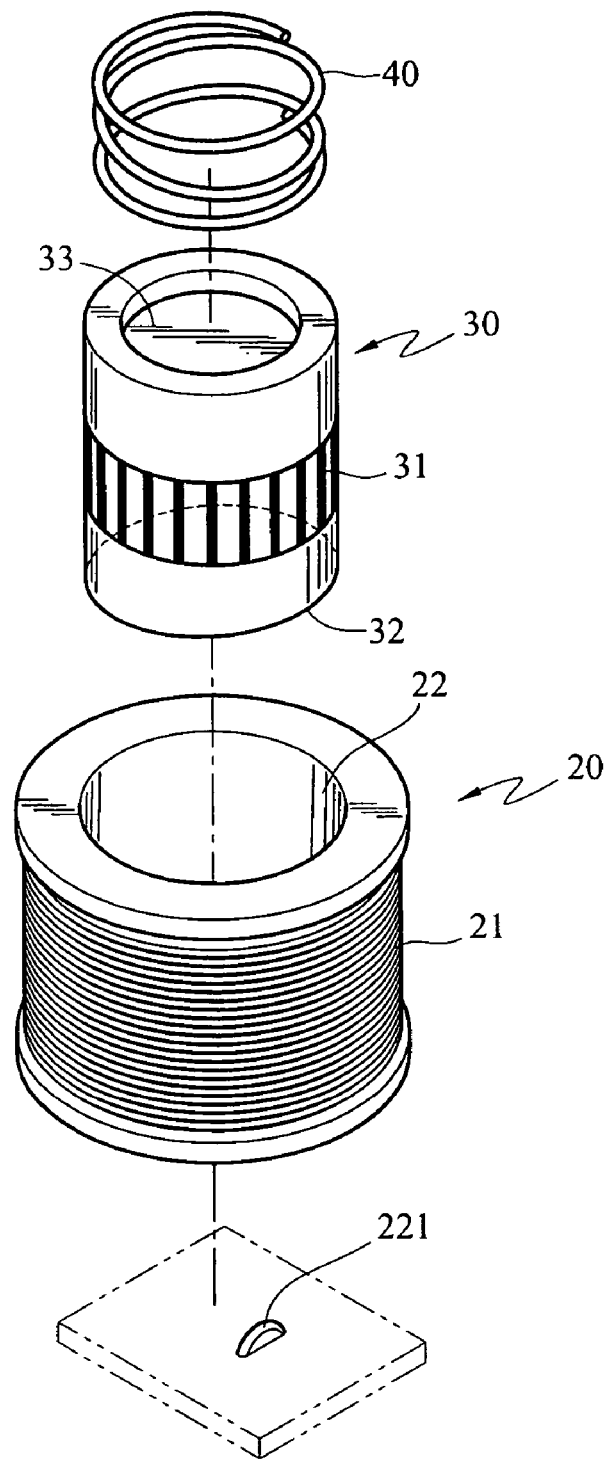
FIG. 6 is an exploded view of the auto focus lens system in a second embodiment.
Figure 7:
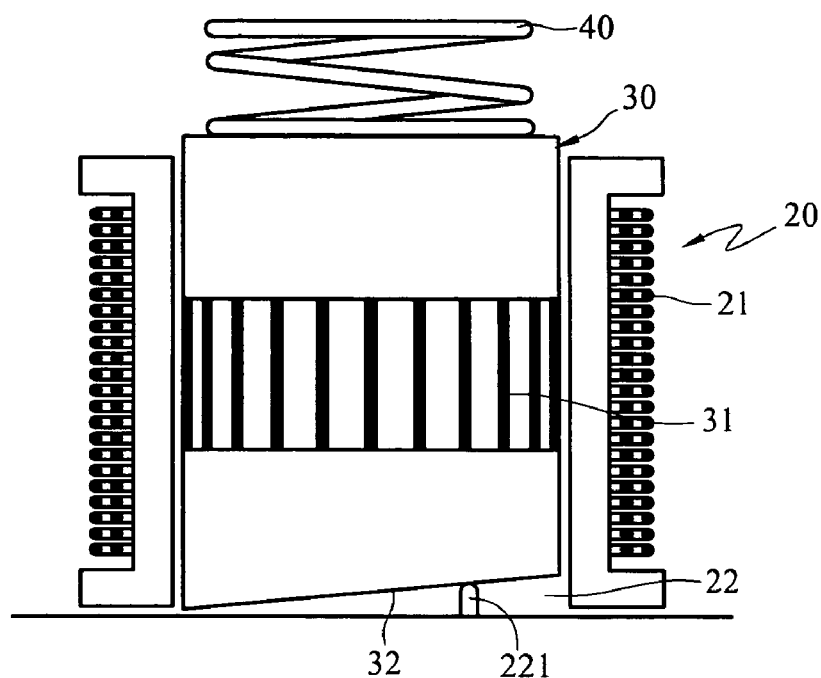
FIG. 7 is an assembly diagram of the auto focus lens system in a second embodiment.

As shown in FIGS. 6 and 7, the auto focus lens according to the second embodiment of the invention contains a coil base 20, a lens barrel 30, and an elastic component 40. The coil base 20 which has a coil 21 wounded in a specific direction around and which has an accommodation hole 22 whose bottom is provided with a stopper 221. A lens 33 is installed inside the lens barrel 30. The material of the lens barrel 30 is a rare earth and the surface of the lens barrel 30 is distributed with a permanent magnet 31. The lens barrel 30 is rotatably installed inside the accommodation hole 22, with a guide surface 32 on one end which is near the stopper 221 of the lens base 30. The guide surface 32 is a slant surface. The elastic component 40 presses against the other end of the lens barrel 30 so that the guide surface 32 touches the stopper 221. When the coil 21 is provided with an electric current, a magnetic force is generated for the coil base 20 and the permanent magnet 31 on the lens barrel 30 to repel each other. The lens barrel 30 rotates according to the guide surface 32 to change the focal length of the camera.

Figure 8:
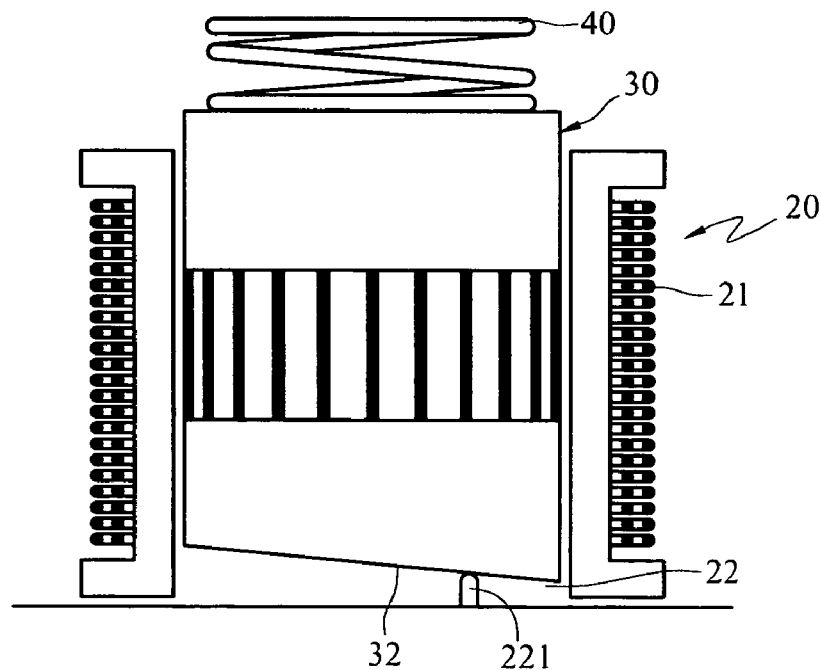
FIG. 8 is another assembly diagram of the auto focus lens system in a second embodiment.

FIG. 8 shows another assembly diagram of the second embodiment auto focus lens system. When the lens barrel 30 is installed inside the accommodation hole 22, the elastic component 40 presses against the other end of the lens barrel 3O making the guide surface 32 touch the stopper 221. When the coil 21 is provided with an electric current, a magnetic force is generated for the permanent magnet 31 on the lens barrel 30 and the coil 20 to repel each other. The lens barrel 30 rotates according to the guide surface 32 to change the focal length of the camera. Since the guide surface 32 is a slant surface, the lens barrel 30 moves toward the outer side of the coil base 20 during rotation. At the same time, the elastic component 40 presses the lens barrel 30 against the stopper 221. Alternatively, the lens barrel 30 can move toward the inner side of the coil base 20 during rotation. At the same time, the elastic component 40 presses the lens barrel 30 against the stopper 221, and thereby the focal length of the camera is changed.

The reason why rare earth is used as the material of the lens barrel 30 is that the lens barrel 30 can be distributed with a permanent magnet 31 after magnetization. More specifically, the rare earth is used as a permanent magnet. As a result, the lens barrel 30 can rotate within the accommodation hole 22 of the coil base 20.

Certain variations would be apparent to those skilled in the art, which variations are considered within the spirit and scope of the claimed invention.

What is claimed is:

1. An auto focus lens system for a camera, comprising:

a coil base, having a coil around the coil base and an accommodation hole;

a stopper, disposed at one end and one side of the accommodation hole;

a lens barrel, rotatably disposed inside the accommodation hole, the lens barrel having an inclined guide surface displaceably contacting the stopper, a permanent magnet around a surface of the lens barrel; and an elastic component, pressing against the lens barrel to constantly push the inclined guide surface against the stopper, wherein the lens barrel is translated axially through the accommodation hole by magnetic repulsion between the permanent magnet and the magnetic force of the coil when electric current flows through the coil, such that the lens barrel rotates about the axis of the accommodation hole responsive to the contact between the inclined guide surface and the stopper.

2. The auto focus lens system of claim 1, wherein the stopper has a round tip in contact with the inclined guide surface.

* * * * *